(12) United States Patent
Cha (10) Patent No.: US 12,316,590 B2
(45) Date of Patent: May 27, 2025

(54) OPERATING METHOD OF TERMINAL AND TERMINAL

(71) Applicant: KAKAO CORP., Jeju-si (KR)

(72) Inventor: Su Hyeok Cha, Seongnam-si (KR)

(73) Assignee: KAKAO CORP., Jeju-si (KR)

(*) Notice: Subject to any disclaimer, the term of this patent is extended or adjusted under 35 U.S.C. 154(b) by 0 days.

(21) Appl. No.: 17/724,502

(22) Filed: Apr. 20, 2022

(65) Prior Publication Data

US 2022/0360551 A1   Nov. 10, 2022

(30) Foreign Application Priority Data

Apr. 21, 2021   (KR) .................... 10-2021-0051767

(51) Int. Cl.
| | |
|---|---|
| *H04L 51/10* | (2022.01) |
| *G06F 3/04817* | (2022.01) |
| *G06F 3/04842* | (2022.01) |
| *G06T 13/80* | (2011.01) |
| *H04L 51/04* | (2022.01) |

(52) U.S. Cl.
CPC .......... *H04L 51/10* (2013.01); *G06F 3/04817* (2013.01); *G06F 3/04842* (2013.01); *G06T 13/80* (2013.01); *H04L 51/04* (2013.01)

(58) Field of Classification Search
None
See application file for complete search history.

(56) References Cited

U.S. PATENT DOCUMENTS

| | | | |
|---|---|---|---|
| 9,684,430 B1* | 6/2017 | Perigault | ............... G06F 3/0237 |
| 2015/0121256 A1* | 4/2015 | Kim | ........................ G06F 3/167 |
| | | | 715/758 |

(Continued)

FOREIGN PATENT DOCUMENTS

| | | |
|---|---|---|
| JP | 2014116910 A | 6/2014 |
| JP | 2015156999 A | 9/2015 |
| KR | 20090027840 A * | 3/2009 |

(Continued)

OTHER PUBLICATIONS

Twitch Adds Emote Only Mode for Chat Author: Lowco Retrieved from URL: https://streamersquare.com/twitch-adds-emote-only-mode-for-chat/ (Year: 2016).*

(Continued)

*Primary Examiner* — Schquita D Goodwin
*Assistant Examiner* — Ishrat Rashid
(74) *Attorney, Agent, or Firm* — CANTOR COLBURN LLP (57) ABSTRACT

An operating method of a terminal on which an application for an instant messaging service is installed includes receiving a selection of a user for an interfacing object displayed in a predetermined area of a chat window for the instant messaging service, switching, in response to the receiving, an input mode in the chat window to a mode for generating a timeline emoticon, generating the timeline emoticon in which a plurality of emoticons selected by the user in the chat window are included in time series, according to the switching of the mode, and transmitting a chat message including the timeline emoticon, wherein the plurality of emoticons included in the timeline emoticon are displayed in the chat window.

19 Claims, 8 Drawing Sheets

(56) References Cited

U.S. PATENT DOCUMENTS

2018/0026922 A1* 1/2018 Perigault .................. G06T 15/02
                                                        715/758
2023/0179553 A1* 6/2023 Viklund .................. H04L 51/42
                                                        455/466

FOREIGN PATENT DOCUMENTS

| KR | 101333270 B1 * | 11/2013 |
| KR | 10-1620050 B1 | 5/2016 |
| KR | 10-1924978 B1 | 12/2018 |
| KR | 102184186 B1 * | 11/2020 |
| KR | 10-2021-0042406 A | 4/2021 |

OTHER PUBLICATIONS

Korean Office Action for KR Application No. 10-2021-0051767 mailed on Aug. 8, 2022, citing the above reference(s). English abstract.

Kozak Max, Line basic + Utility Visor, first edition, Impress Co Ltd, 2020, pp. 158-159.

Japanese Office Action for JP Application No. 2022-068839 mailed on Apr. 4, 2023, citing the above reference(s).

\* cited by examiner

OPERATING METHOD OF TERMINAL AND TERMINAL

CROSS-REFERENCE TO RELATED APPLICATION

This application claims the benefit of Korean Patent Application No. 10-2021-0051767 filed on Apr. 21, 2021, in the Korean Intellectual Property Office, the entire disclosure of which is incorporated herein by reference for all purposes.

BACKGROUND

1. Field of the Invention

The following example embodiments relate to an operating method of a terminal for transmitting and receiving a chat message including a timeline emoticon and the terminal.

2. Description of the Related Art

Various emoticons may be provided to reflect the individualities of users and fun when transmitting messages through an instant messaging service. Users may purchase individual emoticons or emoticon sets in an instant messenger application running on a smartphone, or use a PC to access a separate web page that sells emoticons to purchase emoticons. In addition, users may use icons provided through various events and the like for free for a predetermined period. However, a method of combining or editing emoticons purchased by users in various forms is not provided.

SUMMARY

According to an aspect, there is provided an operating method of a terminal on which an application for an instant messaging service is installed, the operating method including receiving a selection of a user for an interfacing object displayed in a predetermined area of a chat window for the instant messaging service, switching, in response to the receiving, an input mode in the chat window to a mode for generating a timeline emoticon, generating the timeline emoticon in which a plurality of emoticons selected by the user in the chat window are included in time series, according to the switching of the mode, and transmitting a chat message including the timeline emoticon, wherein the plurality of emoticons included in the timeline emoticon are displayed in the chat window.

The timeline emoticon may include at least one of type information indicating that the plurality of emoticons correspond to the timeline emoticon, and index information respectively indicating the plurality of emoticons included in the timeline emoticon.

The generating of the timeline emoticon may include receiving a selection of the user for the plurality of emoticons included in at least one emoticon set available to the user.

The generating of the timeline emoticon may include generating the timeline emoticon based on whether a fixed-term emoticon with a time limit for use is included in the plurality of emoticons.

The generating of the timeline emoticon based on whether a fixed-term emoticon is included may include suspending, when a fixed-term emoticon is included, generating the timeline emoticon, and generating, when a fixed-term emoticon is not included, the timeline emoticon by editing the plurality of emoticons.

The generating of the timeline emoticon based on whether a fixed-term emoticon is included may include checking, when a fixed-term emoticon is included, whether the time limit for use of the fixed-term emoticon expires, and generating the timeline emoticon according to whether the time limit for use expires.

The generating of the timeline emoticon according to whether the time limit for use expires may include generating, when the time limit for use of the fixed-term emoticon does not expire, the timeline emoticon by including the fixed-term emoticon therein.

The generating of the timeline emoticon may include calculating a similarity between a sequence of the plurality of emoticons and a preset hidden sequence, and generating, when the similarity exceeds a preset reference value, the timeline emoticon by automatically inserting a hidden emoticon prepared corresponding to the hidden sequence to the plurality of emoticons.

The generating of the timeline emoticon may include displaying, when a sequence of the plurality of emoticons is edited to have a similarity exceeding a preset reference value to a preset hidden sequence, a hidden emoticon prepared corresponding to the hidden sequence.

The generating of the timeline emoticon may include at least one of editing the plurality of emoticons into an animated format according to an order of being selected by the user, and editing the plurality of emoticons into a slide format of individual emoticons according to the order of being selected by the user.

The generating of the timeline emoticon may include generating the timeline emoticon by editing the plurality of emoticons based on at least one of a content delivery network (CDN) address of a thumbnail image of the plurality of emoticons, information on the plurality of emoticons, and a type of the chat message.

The operating method may further include deactivating, when a time limit for use of a fixed-term emoticon included in a pre-generated timeline emoticon expires, the expired fixed-term emoticon in the pre-generated timeline emoticon, and providing link information for purchasing the deactivated fixed-term emoticon.

The plurality of emoticons may include at least one of a static emoticon and a dynamic emoticon.

The operating method may further include storing the timeline emoticon.

The operating method may further include displaying the interfacing object for switching to an input mode for generating the timeline emoticon in a predetermined area of the chat window.

According to an aspect, there is provided an operating method of a terminal on which an application for an instant messaging service is installed, the operating method including verifying a type of a chat message received through the instant messaging service, calling, when the chat message is of a type including a timeline emoticon in which a plurality of emoticons are included in time series, the plurality of emoticons based on indices of the plurality of emoticons, and displaying the plurality of emoticons in a chat window for the instant messaging service according to a sequence list corresponding to the timeline emoticon.

The calling of the plurality of emoticons may include calling a static emoticon based on an index corresponding to the static emoticon among the indices of the plurality of emoticons, and calling a plurality of individual emoticons constituting a dynamic emoticon based on an index corresponding to the dynamic emoticon among the indices of the plurality of emoticons.

The displaying in the chat window may include calling, when the sequence list matches a preset hidden sequence, a hidden emoticon prepared corresponding to the hidden sequence, and displaying the hidden emoticon and the plurality of emoticons together in a single speech balloon.

The operating method may further include, when an input of a user satisfying a preset condition for the timeline emoticon included in the chat message occurs, displaying information for inducing purchase of the plurality of emoticons included in the timeline emoticon in an area of the chat window where the chat message is displayed.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like components and a repeated description related thereto will be omitted.

Figure 1:
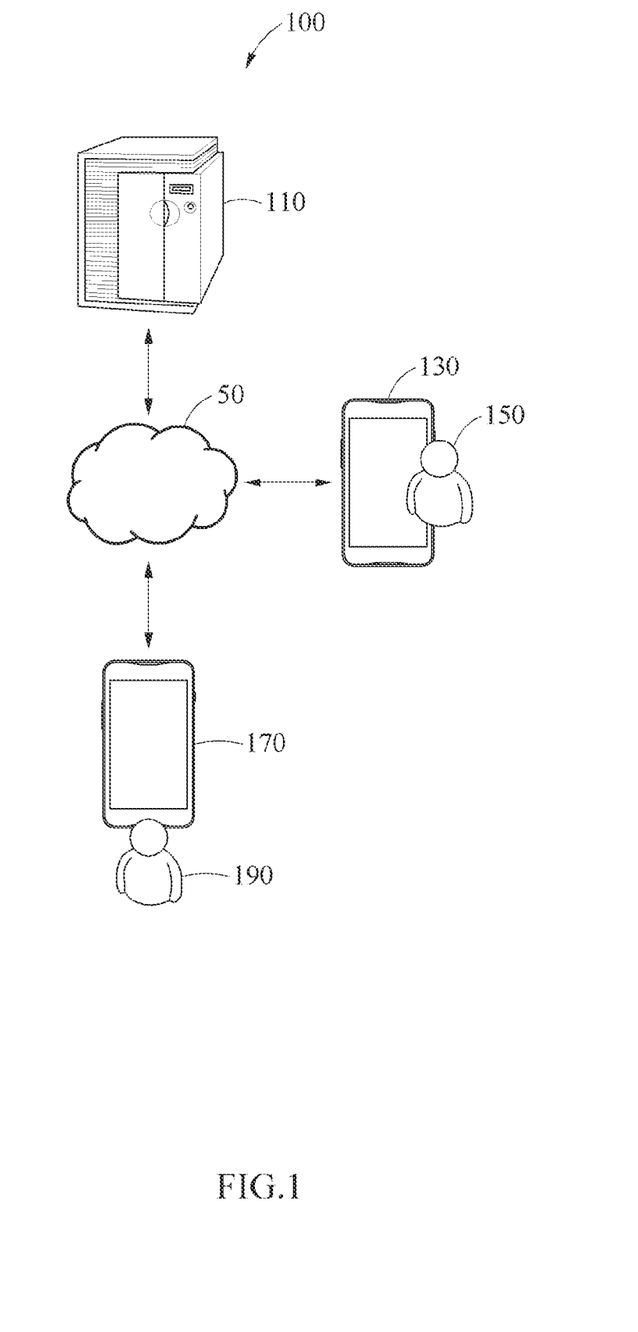
FIG. 1 is a diagram illustrating a configuration of a system for performing an operating method of a terminal according to an example embodiment.

FIG. 1 is a diagram illustrating a configuration of a system for performing an operating method of a terminal according to an example embodiment. Referring to FIG. 1, a system 100 according to an example embodiment may include a server 110, a transmitting terminal 130, and a receiving terminal 170. The transmitting terminal 130 and the receiving terminal 170 may be collectively referred to as "terminals". In addition, a user 150 of the transmitting terminal 130 and a user 190 of the receiving terminal 170 may be collectively referred to as "users".

The server 110 and the user terminals 130 and 170 may be connected to each other through a communication network 50. There may be a single receiving terminal 170 or a plurality of receiving terminals 170.

The server 110 may interoperate with an instant messenger application installed on the user terminals 130 and 170 for a user interface (UI), a function, an operation, or a service. The server 110 may be a server for an instant messaging service, and may create a chatroom for an account of a user who uses the instant messaging service. The server 110 may be, for example, an Instant Message Service (IMS) server, but is not necessarily limited thereto. The server 110 may create a chatroom for providing, for example, a 1:1 chat service between the user 150 of the transmitting terminal 130 and one of the user(s) 19) of the receiving terminal(s) 170 and/or a group chat service between the user 150 and the user(s) 190. The server 110 may include at least one processor for performing a process for the instant messaging service, and a memory for storing data for the instant messaging service.

The server 110 may store information on emoticon set(s) and/or emoticon(s) available to a user based on an account of the user. The information on the emoticon set(s) and/or the emoticon(s) may include, for example, product information of the emoticon set(s) and/or the emoticon(s), index information of the emoticon(s), thumbnails of the emoticon(s), play order information of the emoticons, and play time information of the emoticons.

The product information of the emoticon(s) may include information regarding which is emoticon set an emoticon belongs to, and whether an emoticon is purchased by the user or provided for free or with a predetermined time limit for use through a promotion.

The index information of the emoticon(s) may correspond to information for identifying an emoticon, and the index information may be expressed in different manners when the emoticon is a static emoticon and when the emoticon is a dynamic emoticon. The "static emoticon" may correspond to a motionless emoticon. The "dynamic emoticon" may be an emoticon that has an animation effect through various motions by a combination of one or more individual emoticons. The dynamic emoticon may include a plurality of individual emoticons that show different motions to express a single animation effect. Data (e.g., a plurality of individual emoticons, or a plurality of image frames) for expressing a motion of a dynamic emoticon may be enrolled in advance in, for example, a server or a local cache.

For example, when an emoticon is a static emoticon, an index thereof may be configured with a single number (e.g., "4" or "10") for identifying the static emoticon. In contrast, when an emoticon is a dynamic emoticon, an index thereof may be configured in a form of a combination of numbers (e.g., 2-5, 2-6, 2-7, etc.) for identifying a plurality of individual emoticons showing an animation effect of the dynamic emoticon. The method of indexing static emoticons and dynamic emoticons is not necessarily limited thereto, and the static and dynamic emoticons may be configured in various forms so as to be efficiently identified.

For the thumbnails of the emoticon(s), when an emoticon is a static emoticon, an image of the static emoticon may be used as a thumbnail image as it is. In contrast, when an emoticon is a dynamic emoticon, for example, a representative image related to a subject of the dynamic emoticon may be used as a thumbnail image, but is not necessarily limited thereto.

The play order information of the emoticon and the play time information of the emoticon may correspond to, when an emoticon is a dynamic emoticon, information indicating an order in which individual emoticons constituting a motion of the dynamic emoticon is played, and respective play times of the individual emoticons.

The server 110 may be, for example, a single server computer or a system similar thereto, or one or more server banks, or a plurality of servers arranged in other arrangements. The server 110 may be placed in a single facility or may be a server "cloud" distributed among many different geographic locations.

The user terminals 130 and 170 may be driven by the installed instant messenger application. The instant messenger application may include an application related to a social networking service (SNS) having an instant messenger function. The users 150 and 190 may use the instant messaging service provided by the server 110 through the instant messenger application installed on the user terminals 130 and 170. For example, the users may subscribe to the instant messaging service, create user accounts, and use the instant messaging service with the created user accounts through the application installed on the terminals 130 and 170.

Each of the terminals 130 and 170 may include a display, a memory, a processor, and a communication interface, and may be provided with the instant messaging service and/or the social networking service, like a smartphone or a wearable device, for example. Each of the terminals 130 and 170 may process a user interface or a user interaction through the processor, or may provide a processing result to the server 110.

The user terminals 130 and 170 may include, for example, a personal computer (PC), a netbook computer, a laptop computer, a personal digital appliance (PDA), a smartphone, a wearable device, and various devices for performing a similar function.

The instant messaging service may provide a data transmission/reception function between the terminals 130 and 170 through a chatroom that may be participated in from the terminals 130 and 170 using the user accounts. A chatroom may be participated in using one or more user accounts with which the instant messaging service is subscribed to, and a participant in the chatroom may transmit and receive, to and from other participant(s) through the chatroom, messages including various visual information such as text, emojis, emoticons, and a figure and messages including auditory information such as voices.

An application for an instant messaging service according to an example embodiment may display an interfacing object for switching to an input mode for generating a timeline emoticon in a chat window. The "timeline emoticon" may correspond to one emoticon in which a plurality of emoticons selected by a user are included in time series. The plurality of emoticons may include, for example, static emoticon(s) and/or dynamic emoticon(s). The timeline emoticon may be generated by editing emoticons selected by the user among a plurality of emoticon sets and/or individual emoticons available to the user, and may be displayed in a chat window. An emoticon set may include at least two related emoticons, and may be displayed, for example, like an icon set 311 of FIG. 3A. The plurality of emoticons included in the timeline emoticon may be switched and displayed through, for example, a single speech balloon of a chat window according to an order of being selected by the user.

The emoticon sets and/or individual emoticons "available to the user" may correspond to, for example, emoticons or emoticon set(s) that the user has authority to use, such as emoticon sets or individual emoticons that are purchased directly by the user, received as a gift from another user, or provided through a promotion so as to be used for a predetermined period. In an example embodiment, an emoticon with a time limit for use, such as an emoticon provided through a promotion so as to be used for a predetermined period, will be referred to as a "fixed-term emoticon".

In an example embodiment, a timeline emoticon transmitted as an instant message may have various effects such as, for example, a visual effect, an auditory effect, or a combination thereof. The visual effect may include an animation effect that the emoticon moves.

The timeline emoticon may include, for example, type information indicating that the plurality of emoticons correspond to the timeline emoticon, and index information respectively indicating the plurality of emoticons included in the timeline emoticon. In addition, the timeline emoticon may further include information indicating an arrangement order of individual emoticons included in one timeline emoticon. The information indicating the arrangement order of the individual emoticons may, for example, have the form of a sequence list, but is not necessarily limited thereto.

In an example embodiment, the "interfacing object" may be, for example, a visual object that may be interfaced with a user, such as an icon or a button. The interfacing object for switching to the input mode for generating the timeline emoticon may have, for example, the form of a "Timeline" button 315 at the top of a chat window 310 shown in FIG. 3A or another form such as an icon or a menu bar, but is not necessarily limited thereto.

When the user selects the interfacing object for switching to the input mode for generating the timeline emoticon, displayed in the chat window, the input mode of the chat window may be switched from a simple "message input mode" to a "timeline emoticon generation mode". In the timeline emoticon generation mode, emoticons selected by the user and/or texts input by the user through an input means may be elements constituting one timeline emoticon.

The user may generate a timeline emoticon through an edition, including insertion, deletion, relocation, replacement, and display time adjustment, on the plurality of selected emoticons.

For example, it may be assumed a fixed-term emoticon with a time limit for use is included in the plurality of emoticons selected by the user to generate a timeline emoticon. Since a fixed-term emoticon cannot be used if a predetermined period elapses, when a fixed-term emoticon that has been expired is included, the terminals 130 and 170 may block the generation of the timeline emoticon from the start, or generate the timeline emoticon using the remaining emoticons except for the fixed-term emoticon. Alternatively, the terminals 130 and 170 may include the fixed-term emoticon in the timeline emoticon, but dim the fixed-term emoticon by deactivating the fixed-term emoticon. In this case, "dimming" may be understood as darkening a deactivated icon in gray, or switching, w % ben the fixed-term emoticon is a dynamic emoticon, the dynamic emoticon to a static emoticon and displaying the static emoticon. In addition, the terminals 130 and 170 may provide separate link information or a banner advertisement for purchasing the fixed-term emoticon or land the user on a page for purchasing the emoticon, such that the user may purchase the fixed-term emoticon included in the timeline emoticon and have an authority to use the same.

According to an example embodiment, when a plurality of emoticons are generated by the same producer or included in the same emoticon set, the server may configure a sequence of a preset or predetermined order combination of the emoticons as a "hidden sequence".

When the sequence of the emoticons included in the timeline emoticon edited by the user corresponds to the hidden sequence, the terminals 130 and 170 may automatically insert a new emoticon ("hidden emoticon"), which the user cannot use in general, into the timeline emoticon.

For example, it may be assumed the user generates a timeline emoticon by sequentially selecting emoticons a, f, b, and g included in an emoticon set A and the hidden sequence also has an order of a, f, b, and g.

Since the sequence of the emoticons edited by the user matches the preset hidden sequence, a terminal may generate a timeline emoticon by automatically inserting a hidden emoticon ("x"), prepared in advance corresponding to the hidden sequence, to the emoticons a, f, b, and g. In this case, the hidden emoticon ("x") may be inserted between the emoticons a, f, b, and g selected by the user, or may be inserted at the back or front of the emoticons a, f, b, and g. According to an example embodiment, the hidden emoticon ("x") may not be inserted between the emoticons a, f, b, and g, but may be simply included in the user emoticon set A. Thereafter, the hidden emoticon ("x") may be used by the user like a typical emoticon w % bile being included in the emoticon set A.

For example, it may be assumed the user 150 of the transmitting terminal 130 selects an interfacing object ("Timeline") in the chat window for the instant messaging service and switches an input mode in the chat window to a mode for generating a timeline emoticon.

According to the switching of the mode, the transmitting terminal 130 may generate a timeline emoticon in which a plurality of emoticons selected by the user 150 are included in time series in the chat window, and transmit a chat message S including the timeline emoticon to the receiving terminal 170.

The receiving terminal 170 may receive the chat message S through the instant messaging service and verify a type of the chat message S. The receiving terminal 170 may verify whether the chat message S is of a type including a timeline emoticon, based on, for example, meta-information corresponding to the chat message S.

When it is verified the chat message S is of a type including a timeline emoticon, the receiving terminal 170 may call, based on indices of the plurality of emoticons included in the chat message S, a plurality of emoticons corresponding to the indices from the server 110 or a local cache (not shown).

The receiving terminal 170 may display the plurality of called emoticons according to a sequence list corresponding to the timeline emoticon in a speech balloon in the chat window for the instant messaging service, thereby providing a chat message including the timeline emoticon to the user 190. The plurality of emoticons constituting the timeline emoticon may be switched and displayed according to an order of being selected by the user 150 in a single speech balloon.

Figure 2:
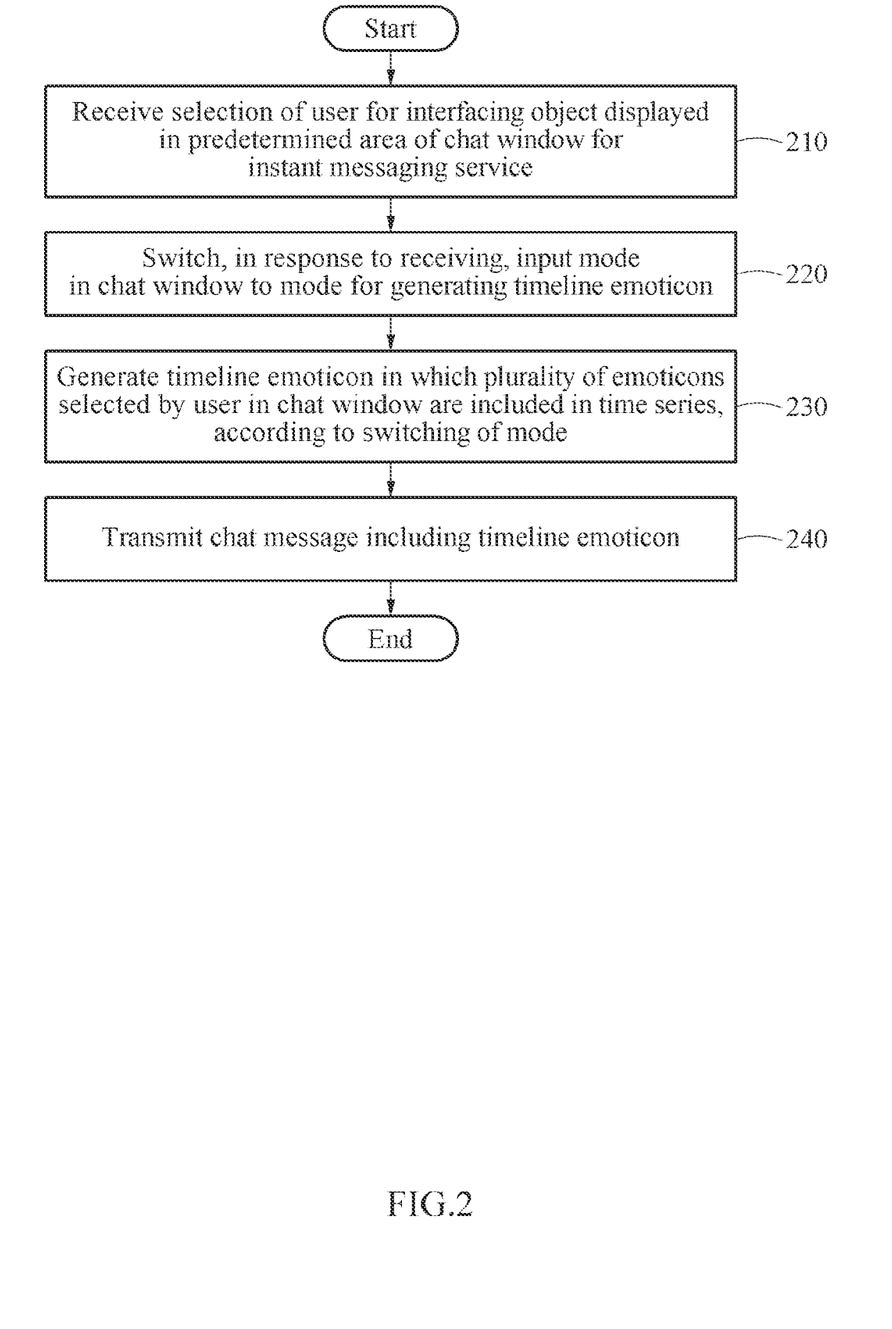
FIG. 2 is a flowchart illustrating an operating method of a terminal according to an example embodiment.
Figure 3A:
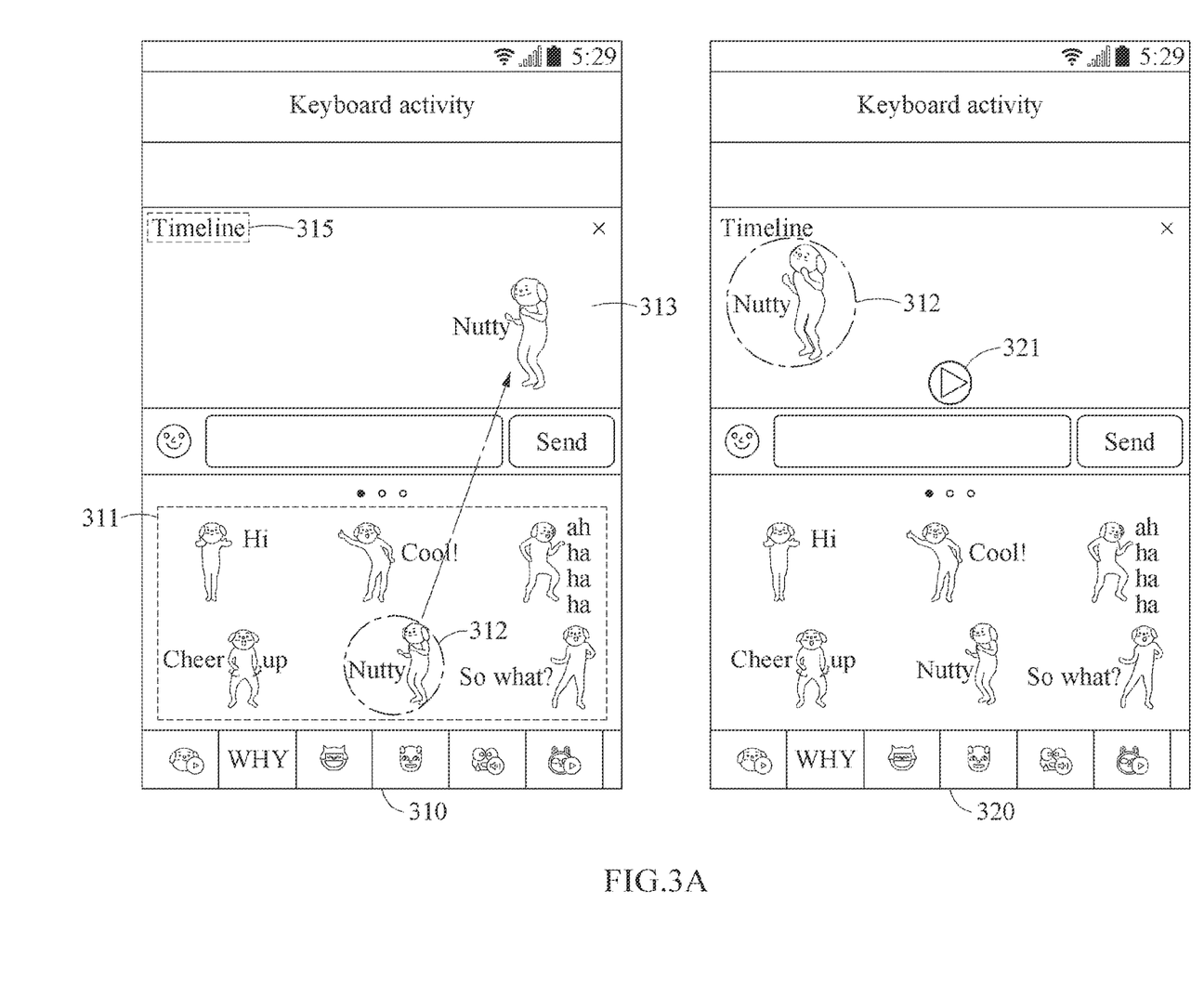
FIGS. 3A to 3C are views illustrating a process of generating a timeline emoticon according to an example embodiment.
Figure 3B:
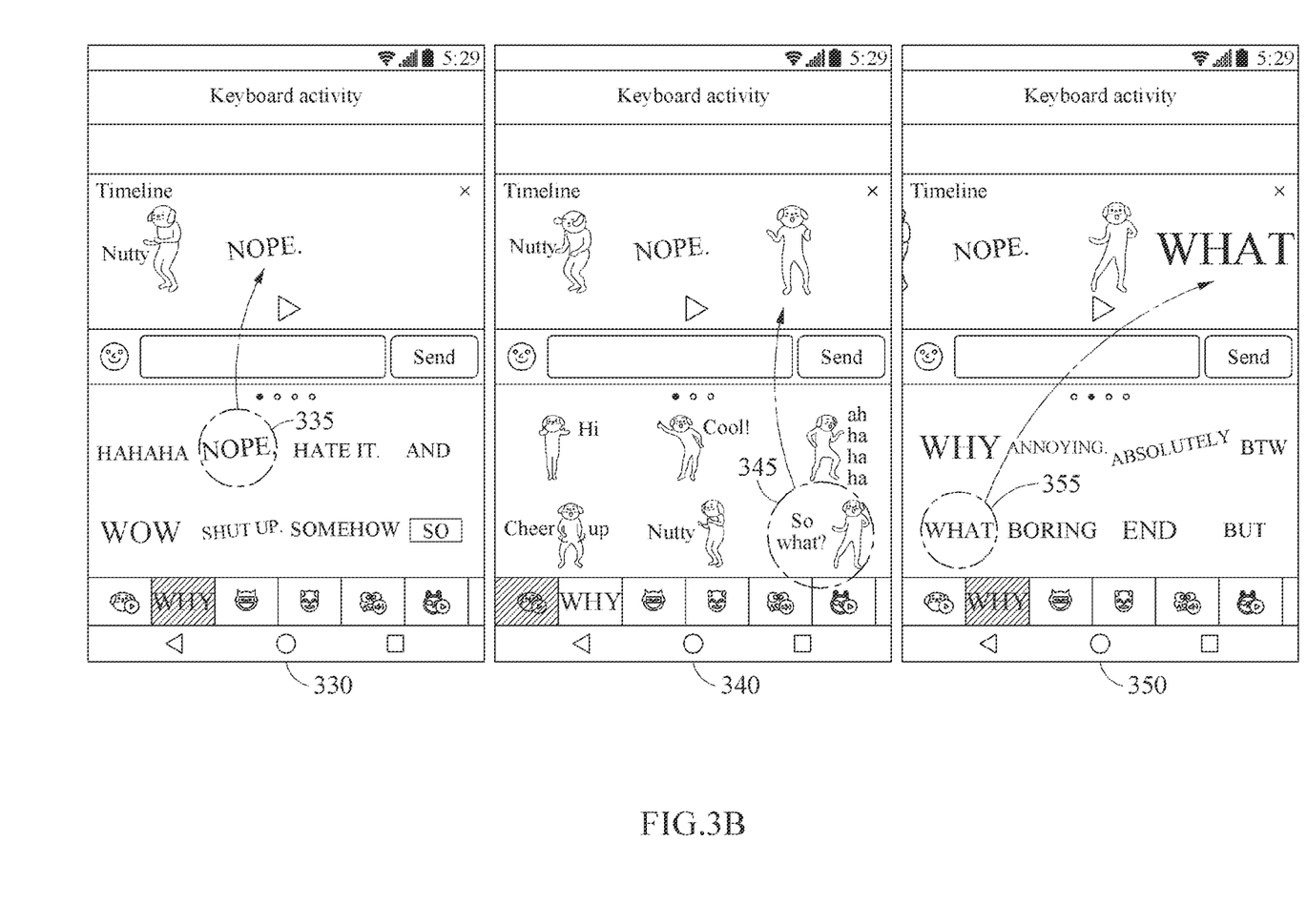
Figure 3C:
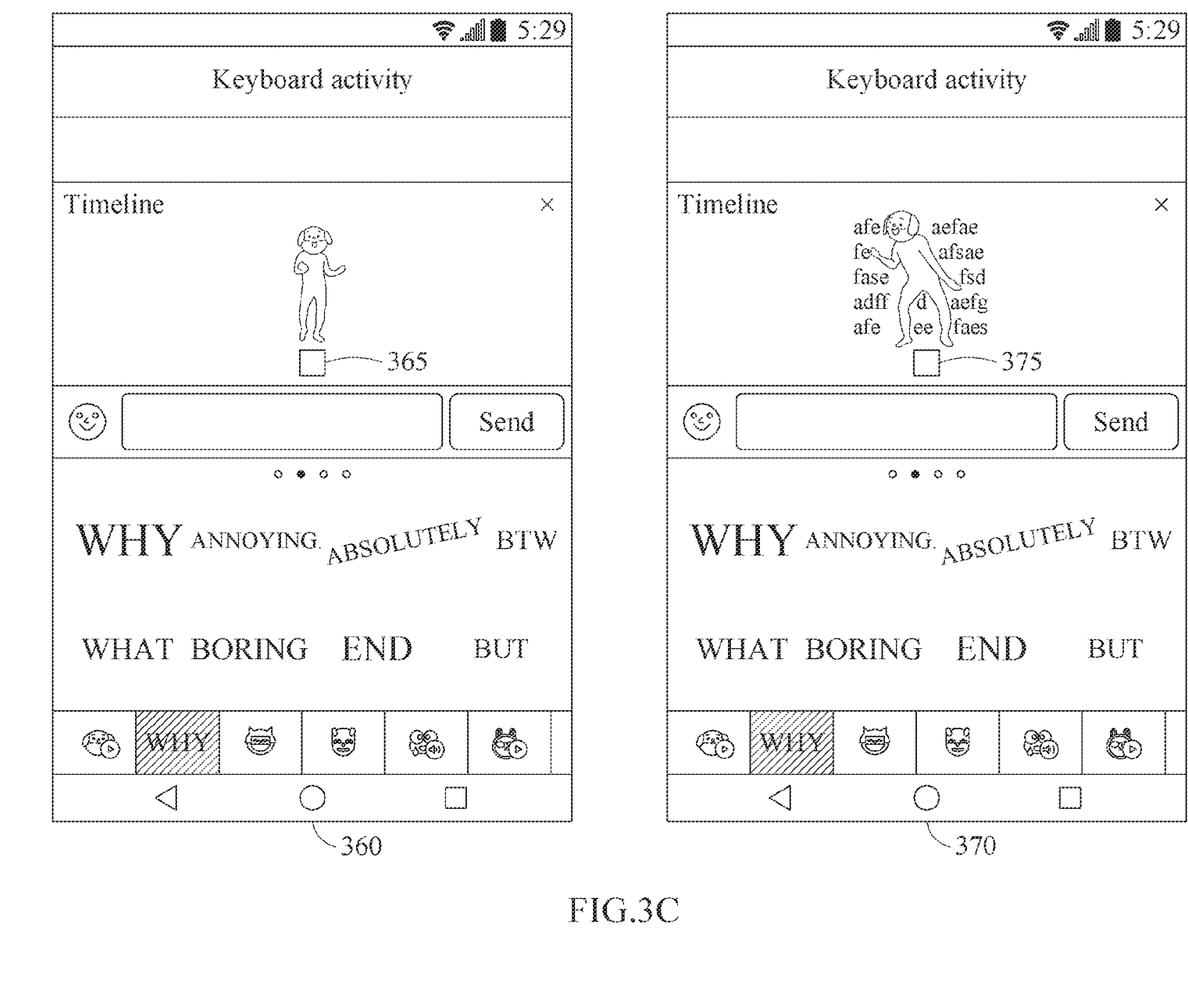

FIG. 2 is a flowchart illustrating an operating method of a terminal according to an example embodiment, and FIGS. 3A to 3C are views illustrating a process of generating a timeline emoticon according to an example embodiment. In the following example embodiments, operations may be performed sequentially, but are not necessarily performed sequentially. For example, the operations may be performed in different orders, and at least two of the operations may be performed in parallel.

Referring to FIGS. 2 and 3, a process of transmitting a chat message through operations 210 to 240 by a terminal on which an application for an instant messaging service is installed is illustrated. Here, the terminal may correspond to the aforementioned transmitting terminal 130 which transmits a chat message to a receiving terminal.

In operation 210, the terminal receives a selection of a user for an interfacing object displayed in a predetermined area of a chat window for the instant messaging service. Prior to operation 210, the terminal may display the interfacing object 315, as in the screen 310 of FIG. 3A, for switching to an input mode for generating a timeline emoticon in a predetermined area of the chat window. The terminal may receive a selection of the user for the displayed interfacing object 315.

In operation 220, the terminal switches, in response to the receiving of operation 210, an input mode in the chat window to a mode for generating a timeline emoticon ("timeline emoticon generation mode"). As the input mode of the chat window is switched to the timeline emoticon generation mode, various indicators indicating that the timeline emoticon generation mode is in activation may appear in the chat window.

For example, as the input mode of the chat window is switched to the timeline emoticon generation mode, a text color of the interfacing object 315 displayed in the chat window of the screen 310 may be changed (for example, from white to green), or the interfacing object 315 may flicker. According to an example embodiment, a separate indicator other than the interfacing object 315 may be displayed to indicate that the input mode of the chat window is switched to the timeline emoticon generation mode.

In operation 230, the terminal generates a timeline emoticon in which a plurality of emoticons selected by the user in the chat window are included in time series, according to the switching of the mode in operation 220.

The user may select a plurality of emoticons available to the user while the timeline emoticon generation mode is in activation. The terminal may receive a selection of the user for the plurality of emoticons included in at least one emoticon set available to the user. For example, when emoticon sets X, Y, and Z are available to a user A, the user A may select a plurality of emoticons to configure a timeline emoticon from among emoticons included in the emoticon sets X, Y, and Z. In this case, the emoticons belonging to the emoticon sets X, Y. and Z may be static emoticon(s) or dynamic emoticon(s).

The user may select, for example, an icon 312 included in an icon set 311 displayed on the screen 310 of FIG. 3A. In this case, since icons included in the icon set 311 are displayed in a deactivated state, it may be difficult to verify whether the icon 312 selected by the user is a static emoticon or a dynamic emoticon having an animation effect. When the emoticon is a dynamic emoticon, a static image representing the emoticon in the icon set 311 may be displayed. Alternatively, when the emoticon is an emoticon having an auditory effect, only the emoticon may be displayed without the auditory effect.

As the input mode of the chat window is switched to the timeline emoticon generation mode, an area where an input text or a speech balloon is displayed in the chat window (e.g., an area 313 of FIG. 3A) may be switched to a preview area of the timeline emoticon, and the icon 312 selected by the user may be displayed in the preview area 313 of the timeline emoticon.

When the timeline emoticon generation mode is in activation, for example, a play button 321 of a triangle ▷ shown in a screen 320 of FIG. 3A may be displayed in the emoticon preview area 313. When the user selects the play button 321, the plurality of emoticons selected by the user may be displayed in the form of a timeline emoticon. In other words, the play button 321 may correspond to a button for previewing the timeline emoticon.

The user may select the play button 321 and see that the plurality of emoticons included in the timeline emoticon are switched and displayed according to an order of being selected by the user.

For example, it may be assumed the user selects the icon 312, and then a static emoticon 335 on a screen 330 of FIG. 3B, a dynamic emoticon 345 on a screen 340, and a static emoticon 355 on a screen 350 sequentially.

The terminal may edit the plurality of emoticons 312, 335, 345, and 355 in an animated format in which the emoticons are naturally connected according to the order of being selected by the user. Alternatively, the terminal may edit the plurality of emoticons 312, 335, 345, and 355 in an individual emoticon slide format in which the plurality of emoticons 312, 335, 345, and 355 are switched at predetermined times according to the order of being selected by the user. In this case, the terminal may set a play time of each emoticon differently according to whether a selected emoticon is a static emoticon or a dynamic emoticon.

In addition, in the emoticon preview area 313, for example, stop buttons 365 and 375 of a square (□) shown in a screen 360 or a screen 370 of FIG. 3C may be displayed. The stop buttons 365 and 375 may correspond to buttons for stopping previewing the timeline emoticon in progress. The user may stop previewing the timeline emoticon using the stop button 365 shown in the screen 360 of FIG. 3C or the stop button 375 shown in the screen 370 of FIG. 3C.

As the user selects the stop buttons 365 and 375, the terminal may terminate previewing the timeline emoticon and return to a timeline emoticon generation mode for editing a timeline emoticon. In this case, the play button 321 and the stop buttons 365 and 375 may correspond to buttons in the form of a toggle.

An example embodiment describes the preview function of the timeline emoticon is turned on/off through a toggle button, but is not limited thereto, and the preview function of the timeline emoticon may be turned on/off in the form of a menu bar or other various user interfaces.

In operation 230, the terminal generates a timeline emoticon by editing the plurality of emoticons based on, for example, at least one of a content delivery network (CDN) address of a thumbnail image of the plurality of emoticons selected by the user, information on the plurality of emoticons, and a type of the chat message. In this case, the information on the emoticons may include, for example, product information of the emoticons, index information of the emoticons, image type information (e.g., webp/gif/png, etc.) of the emoticons, thumbnails (e.g., png thumbnails) of the emoticons, play order information of the emoticons, and play time information of the emoticons, and is not necessarily limited thereto.

According to an example embodiment, a fixed-term emoticon with a time limit for use, provided through a promotion, may be included in the plurality of emoticons selected by the user. In this case, the terminal may generate the timeline emoticon based on whether a fixed-term emoticon with a time limit for use is included in the plurality of emoticons. A method of generating, by the terminal, a timeline emoticon based on whether a fixed-term emoticon is included will be described in more detail with reference to FIG. 4 below.

In operation 230, the terminal may generate the timeline emoticon by relocating (changing the arrangement order of) the plurality of emoticons selected by the user in the timeline emoticon generation mode or by editing the plurality of emoticons, such as by inserting, deleting, or adjusting display times of the emoticons.

A method of selecting a plurality of emoticons selected by the user in the timeline emoticon generation mode is as follows.

For example, when the user makes a long click on a specific emoticon displayed in the emoticon preview area 313 for a preset period, the terminal may change the input mode in the chat window to an arrangement order edition mode for relocating the plurality of emoticons. In the arrangement order edition mode, the user may select an emoticon to be relocated and change the arrangement order of the emoticons by dragging and dropping the selected emoticon.

Alternatively, when the user makes a long click on a specific emoticon displayed in the emoticon preview area 313, the terminal may also display information indicating the current arrangement order of the emoticons above the emoticons according to the arrangement order of the plurality of emoticons constituting the current timeline emoticon (e.g., numerals 1, 2, 3, and the like displayed according to the arrangement order). The user may easily identify the arrangement order of the plurality of emoticons through the information indicating the current arrangement order displayed above the emoticons.

According to an example embodiment, when the user makes a long click on a specific emoticon displayed in the emoticon preview area 313 for a preset or predetermined period, the terminal may display a recycle bin icon in a predetermined area of the chat window. The user may move the long-clicked specific emoticon to the location of the recycle bin icon through drag and drop, thereby deleting a specific emoticon included in the timeline emoticon.

For example, when a sequence of the plurality of emoticons included in the timeline emoticon is edited to match a preset hidden sequence, the terminal may generate the timeline emoticon by inserting a hidden emoticon prepared corresponding to the hidden sequence to the plurality of emoticons automatically or according to a selection of the user. A method of generating a timeline emoticon when a sequence of a plurality of emoticons included in the timeline emoticon is edited to match a preset hidden sequence will be described in more detail with reference to FIG. 5 below.

In operation 240, the terminal transmits a chat message including the timeline emoticon generated in operation 230. The terminal may release the timeline emoticon generation mode as the user clicks a "send" button of the chat window and finally, transmit the edited timeline emoticon. At this time, the plurality of emoticons included in the timeline emoticon are displayed in a chat window of a receiving terminal. The plurality of emoticons may be switched to each other according to the order of being selected by the user, and displayed through, for example, a single speech balloon. An operation of the receiving terminal that receives the chat message including the timeline emoticon will be described in more detail with reference to FIG. 6 below.

The terminal may store the timeline emoticon generated in operation 230 to be reused. The terminal may store the timeline emoticons in, for example, an emoticon favorites tab, or may be separately stored in a timeline tab similar to the emoticon favorites tab. In this case, the stored timeline emoticon may include information such as, for example, a name of the timeline emoticon, a generation date of the timeline emoticon, information on each emoticon file, information on emote display by time, and a representative thumbnail. The name of the timeline emoticon may be an internally randomly generated name that is not visible to the user. The information on each emoticon file may include information on individual emoticons included in the timeline emoticon. The information on emote display by time may include information related to the display of each of the individual emoticons included in the timeline emoticon (e.g., a display time and a display type). The representative thumbnail indicating an emoticon is a timeline emoticon may have, for example, a grid form of multiple emoticons included in the timeline emoticon or a form in which the multiple emoticons are synthesized in a specific shape, but is not necessarily limited thereto.

When a time limit for use of a fixed-term emoticon included in a pre-generated timeline emoticon expires, the timeline emoticon or the fixed-term emoticon may be processed differently according to policies. According to an example embodiment, the terminal may deactivate, when the time limit for use of the fixed-term emoticon included in the pre-generated timeline emoticon expires, the expired fixed-term emoticon in the pre-generated timeline emoticon. The terminal may provide link information for purchasing the deactivated fixed-term emoticon. Alternatively, when the time limit for use of the fixed-term emoticon included in the pre-generated timeline emoticon expires, the terminal may deactivate the pre-generated timeline emoticon itself, and provide link information for purchasing the fixed-term emoticon included in the timeline emoticon.

Figure 4:
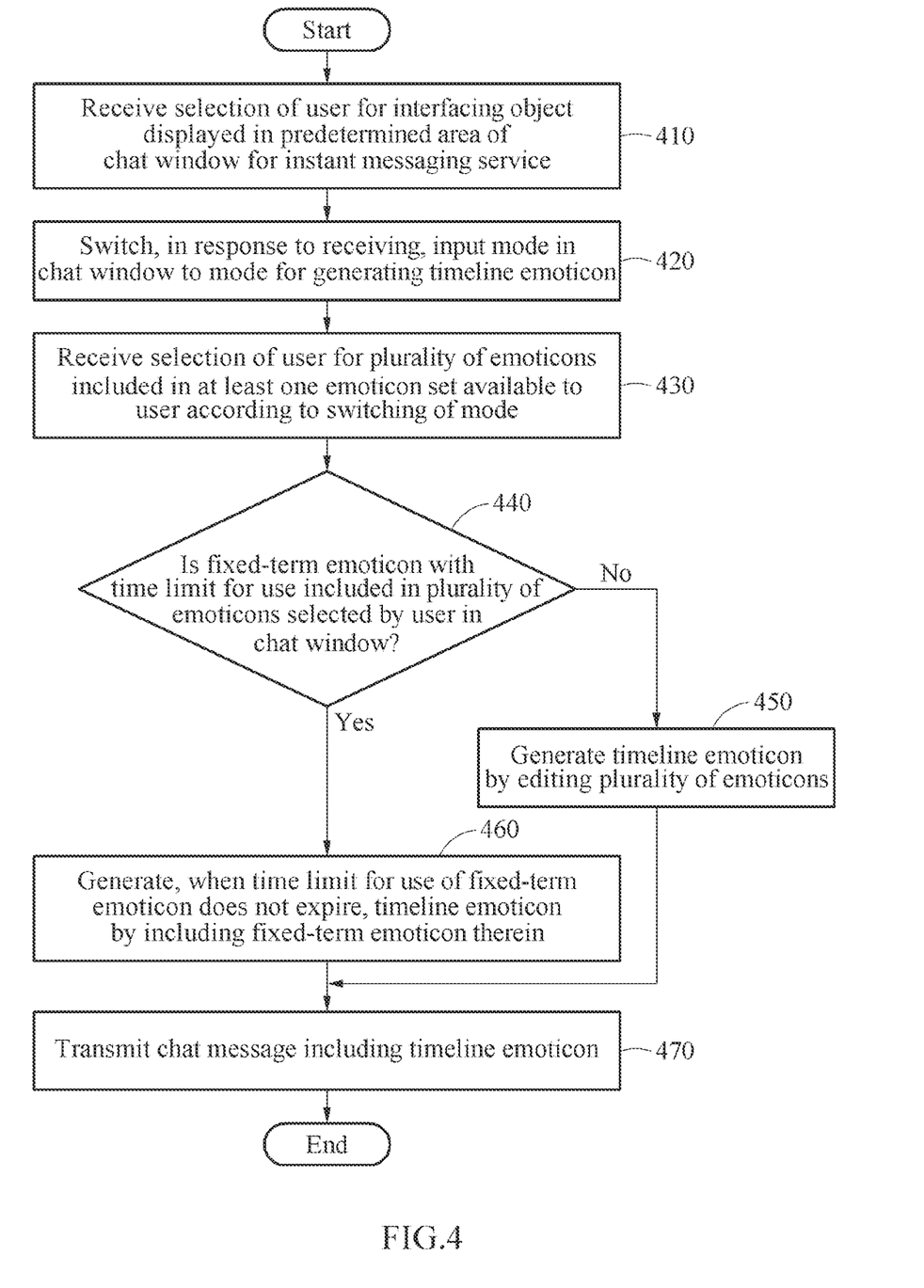
FIGS. 4 and 5 are flowcharts illustrating an operating method of a terminal according to an example embodiment.

FIG. 4 is a flowchart illustrating an operating method of a terminal according to another example embodiment. In the following example embodiments, operations may be performed sequentially, but are not necessarily performed sequentially. For example, the operations may be performed in different orders, and at least two of the operations may be performed in parallel.

Referring to FIG. 4, a process of transmitting a chat message including a timeline emoticon by a terminal through operations 410 to 470 is illustrated. Here, the terminal may correspond to the aforementioned transmitting terminal 130 which transmits a chat message to a receiving terminal.

In operation 410, the terminal may receive a selection of a user for an interfacing object displayed in a predetermined area of a chat window for an instant messaging service.

In operation 420, the terminal may switch, in response to the receiving of operation 410, an input mode in the chat window to a mode for generating a timeline emoticon.

In operation 430, the terminal may receive a selection of the user for a plurality of emoticons included in at least one emoticon set available to the user according to the mode switch of operation 420.

In operation 440, the terminal may determine whether a fixed-term emoticon with a time limit for use is included in the plurality of emoticons selected by the user in the chat window through operation 430. The terminal may determine, for example, whether a fixed-term emoticon is included in the plurality of emoticons through information on the corresponding emoticon (e.g., product information of the corresponding emoticon).

For example, it may be assumed it is determined in operation 440 that a fixed-term emoticon is not included. In operation 450, the terminal may generate a timeline emoticon by editing the plurality of emoticons selected in operation 430. In operation 470, the terminal may transmit a chat message including the timeline emoticon generated in operation 450.

On the other hand, it may be assumed it is determined in operation 440 that a fixed-term emoticon is included. In this case, the terminal may suspend generating the timeline emoticon according to an example, and generate the timeline emoticon according to whether the time limit for use of the fixed-term emoticon expires.

In operation 460, when the time limit for use of the fixed-term emoticon does not expire, the terminal may generate the timeline emoticon by including the fixed-term emoticon therein. In this case, if the time limit for use of the fixed-term emoticon expires, the terminal may deactivate the expired fixed-term emoticon to be dimmed in the timeline emoticon. The terminal may provide separate link information for purchasing an emoticon associated with the deactivated fixed-term emoticon, that is, an emoticon that is identical to the deactivated fixed-term emoticon and has no time limit, or land the user on a page for purchasing the emoticon that has no time limit.

In operation 470, the terminal may transmit a chat message including the timeline emoticon generated in operation 460.

Figure 5:
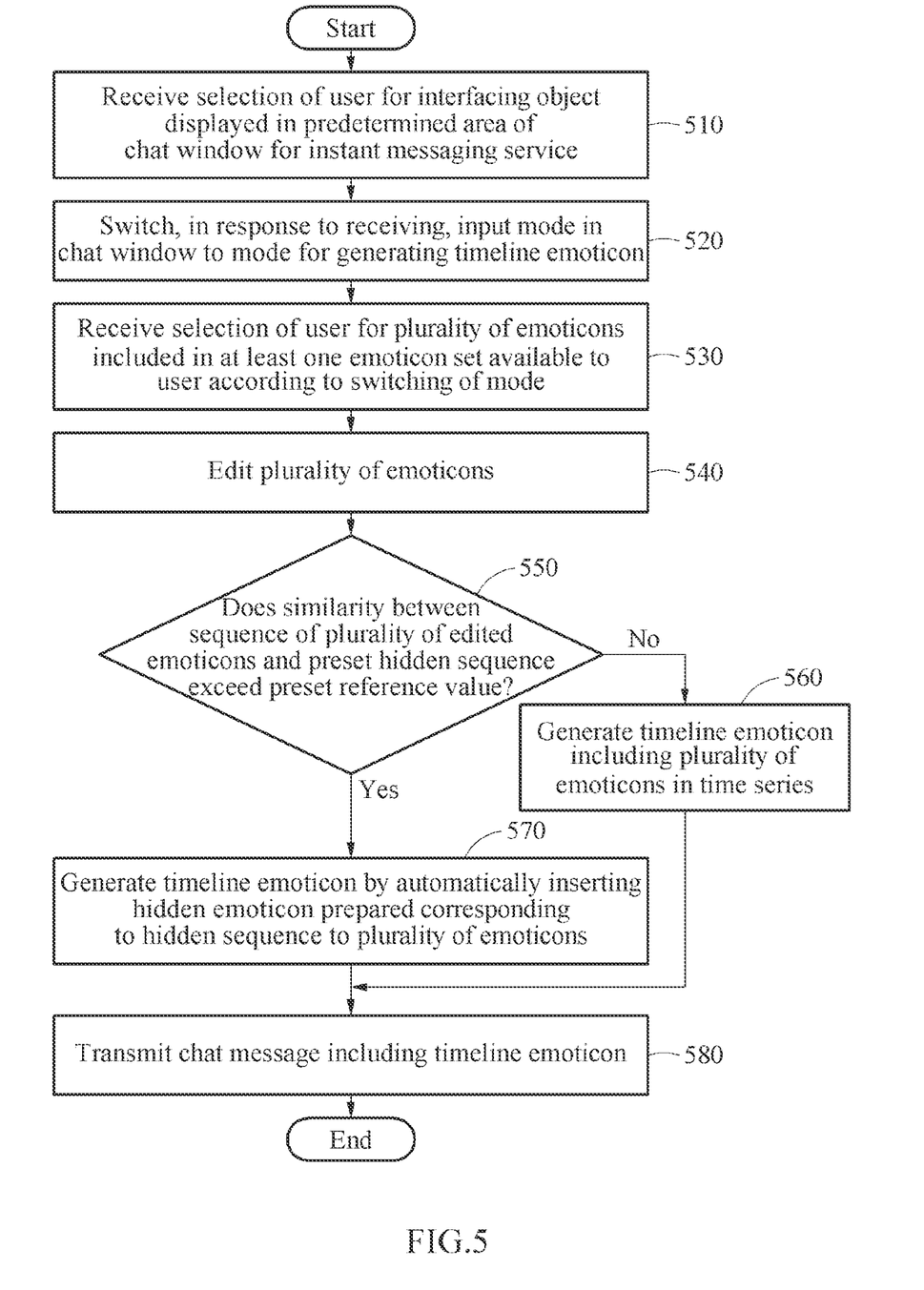

FIG. 5 is a flowchart illustrating an operating method of a terminal according to another example embodiment. In the following example embodiments, operations may be performed sequentially, but are not necessarily performed sequentially. For example, the operations may be performed in different orders, and at least two of the operations may be performed in parallel.

Referring to FIG. 5, a process of transmitting a chat message including a timeline emoticon by a terminal through operations 510 to 580 is illustrated. Operations 510 to 530 of FIG. 5 are the same as operations 410 to 430 described with reference to FIG. 4. Thus, the corresponding description may apply thereto. Hereinafter, only operations differing from the example of FIG. 4 will be described.

In operation 540, the terminal may edit a plurality of emoticons selected by the user in operation 530. The terminal may perform an edition, such as adding the plurality of emoticons selected by the user to an emoticon preview area, deleting an emoticon displayed in the emoticon preview area according to a selection of the user, or adjusting an arrangement position in the emoticon preview area.

In operation 550, the terminal may calculate a similarity between a sequence of the plurality of emoticons edited in operation 540 and a preset hidden sequence, and determine whether the calculated similarity exceeds a preset reference value.

For example, it may be assumed it is determined in operation 550 that the similarity does not exceed the preset reference value. In operation 560, the terminal may generate a timeline emoticon including the plurality of emoticons edited in operation 540 in time series. In operation 580, the terminal may transmit a chat message including the timeline emoticon generated in operation 560.

Conversely, it may be assumed it is determined in operation 550 that the similarity exceeds the preset reference value. In operation 570, the terminal may generate a timeline emoticon by automatically inserting a hidden emoticon prepared corresponding to the hidden sequence to the plurality of emoticons. In operation 580, the terminal may transmit a chat message including the timeline emoticon generated in operation 570.

According to an example embodiment, the terminal may display, when the sequence of the plurality of emoticons is edited to have a similarity exceeding a preset reference value to the preset hidden sequence in operation 550, the hidden emoticon prepared corresponding to the hidden sequence. In this case, the terminal may generate the timeline emoticon by adding the hidden emoticon to the plurality of emoticons according to a selection of the user for the hidden emoticon, or include the hidden emoticon in a user emoticon set A, rather than adding the hidden emoticon to the plurality of emoticons, for the user to use the hidden emoticon like a typical emoticon.

For example, when the user selects "Yes" for a user interface that inquires whether to use a hidden emoticon, the terminal may generate the timeline emoticon by adding the hidden emoticon to the plurality of emoticons. When the user selects "No", the terminal may generate the timeline emoticon using the plurality of emoticons that are originally edited, except for the hidden emoticon.

In this case, the "hidden emoticon" may be an emoticon that is hidden so as not to be purchasable or selectable in a typical manner. The hidden emoticon may correspond to an emoticon that the user does not originally have authority to use, but is provided through a promotion by achieving a hidden sequence preset by a server or a producer of the corresponding emoticon set. The hidden emoticon may act as a fun factor when the user uses the timeline emoticon, and may induce the user to use the timeline emoticon.

Figure 6:
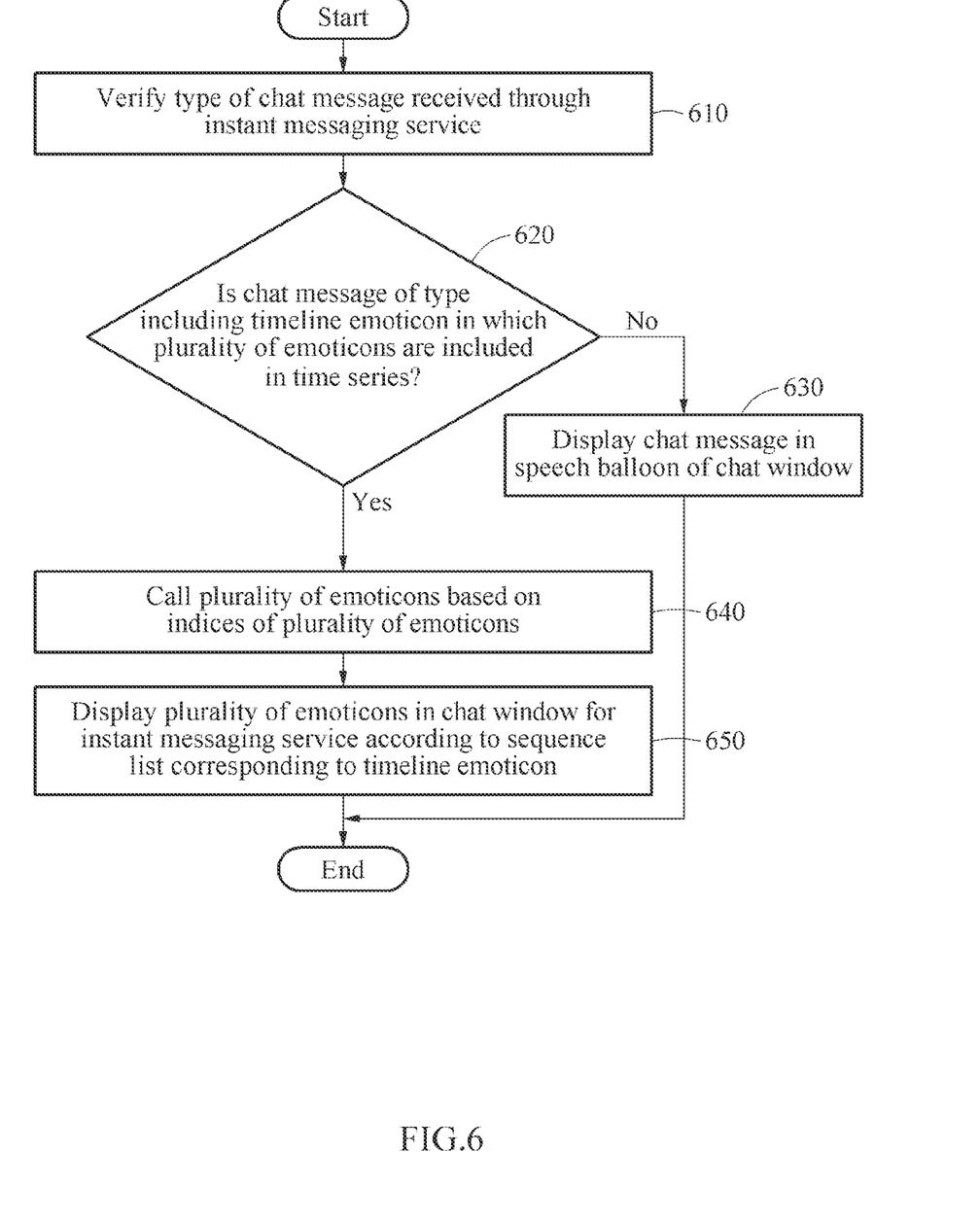
FIG. 6 is a flowchart illustrating an operating method of a terminal according to another example embodiment.

FIG. 6 is a flowchart illustrating an operating method of a terminal according to another example embodiment. In the following example embodiments, operations may be performed sequentially, but are not necessarily performed sequentially. For example, the operations may be performed in different orders, and at least two of the operations may be performed in parallel.

Referring to FIG. 6, a process of receiving a chat message and displaying the chat message in a chat window through operations 610 to 650 by a terminal on which an application for an instant messaging service is installed is illustrated. Here, the terminal may correspond to the aforementioned receiving terminal 170 which receives a chat message from a transmitting terminal.

In operation 610, the terminal verifies a type of a chat message received through an instant messaging service. The terminal may verify whether the chat message is of a type including a timeline emoticon or of a type not including a timeline emoticon, based on, for example, meta-information corresponding to the received chat message.

In operation 620, the terminal determines whether the chat message verified in operation 610 is of a type including a timeline emoticon in which a plurality of emoticons are included in time series.

For example, it may be assumed it is determined in operation 620 that the chat message is not a chat message of a type including a timeline emoticon. In operation 630, the terminal may display the received chat message in speech balloon(s) of the chat window.

Conversely, it may be assumed it is determined in operation 620 that the chat message is of a type including a timeline emoticon. In operation 640, the terminal calls the plurality of emoticons based on indices of the plurality of emoticons included in the chat message. The terminal may extract the indices of the plurality of emoticons constituting the timeline emoticon from information on the timeline emoticon included in the chat message. The terminal may call, using the extracted indices, the plurality of emoticons corresponding to the extracted indices from a server (e.g., the server 110 of FIG. 1) or a local cache.

In operation 640, the terminal may call a static emoticon based on an index corresponding to the static emoticon among the indices of the plurality of emoticons. Alternatively, the terminal may call a plurality of individual emoticons constituting a dynamic emoticon based on an index corresponding to the dynamic emoticon among the indices of the plurality of emoticons. Accordingly, the terminal may call information on a play order and play times of the individual emoticons together with the plurality of individual emoticons, thereby accurately implementing an animation effect of the dynamic emoticon.

In operation 650, the terminal displays the plurality of emoticons called in operation 640 in a chat window for the instant messaging service according to a sequence list corresponding to the timeline emoticon. In this case, the sequence list corresponding to the timeline emoticon may be stored in the timeline emoticon together with type information and index information. The "sequence list" may correspond to a list indicating a display order of individual emoticons constituting the timeline emoticon. The sequence list may be replaced with various types of information indicating the display order of individual emoticons. The terminal may display the plurality of emoticons called in operation 640 in, for example, a single speech balloon of the chat window for the instant messaging service according to the sequence list corresponding to the timeline emoticon.

In operation 650, when the sequence list corresponding to the timeline emoticon matches a preset hidden sequence, the terminal may call a hidden emoticon prepared corresponding to the hidden sequence from the server or the local cache. The terminal may display the hidden emoticon and the plurality of emoticons together in a single speech balloon.

According to an example embodiment, when a user input that satisfies a preset condition for a timeline emoticon included in a chat page occurs, the terminal may display information for inducing purchase of individual emoticons included in the timeline emoticon in an area of the chat window where a chat message is displayed. In this case, the information for inducing purchase of individual emoticons may include, for example, an advertising phrase that induces purchase of the individual emoticons, a banner advertisement, and link information to a page for purchasing the individual emoticons, and is not necessarily limited thereto. In this case, the preset condition may be, for example, an input of the user pressing the timeline emoticon included in the chat page for a preset or predetermined time (e.g., more than two or three seconds). When an input of pressing the timeline emoticon for a preset or predetermined time occurs, the terminal may provide link information to an item group page for purchasing the individual emoticons included in the timeline emoticon or emoticon sets respectively corresponding to the individual emoticons at a time, or provide a banner advertisement for purchasing each of the emoticon sets. As the user selects the link information to the item group page, the terminal may land the user on the item group page.

Although not shown in the drawings, the terminal according to an example embodiment may include a processor, a display, and a communication interface. The terminal may further include a memory and/or a sensor. The display, the processor, and the memory may be connected to each other via a bus. The terminal may be, for example, a PC, a notebook computer, a portable terminal, a smartphone, a wearable device, or a user device for performing the same or similar function.

In response to a selection of the user for an interfacing object displayed in a predetermined area of the chat window for the instant messaging service, the processor switches an input mode in the chat window to a mode for generating a timeline emoticon. The processor generates a timeline emoticon in which a plurality of emoticons selected by the user in the chat window are included in time series according to the switching of the mode. The processor transmits a chat message including the timeline emoticon.

The display displays a speech balloon including the timeline emoticon through the chat window of the instant messaging service. The memory may include information on the timeline emoticon.

In addition, the processor may perform the at least one method described above with reference to FIGS. 1 to 6 or an algorithm corresponding to the at least one method. The processor may execute a program and control the terminal. Program code to be executed by the processor may be stored in the memory.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An operating method of a terminal on which an application for an instant messaging service is installed, the operating method comprising:
receiving a first selection of a user for an interfacing object displayed in a predetermined area of a chat window for the instant messaging service;
switching, in response to the receiving, an input mode in the chat window to a mode for generating a timeline emoticon;
receiving a second selection of the user for a plurality of emoticons included in at least one emoticon set available to the user, according to the switching of the mode;

generating the timeline emoticon including a sequence list indicating the plurality of emoticons to be successively switched between based on an order of the second selection; and transmitting a chat message including the timeline emoticon, wherein by using the sequence list of the timeline emoticon by a terminal that received the chat message the plurality of emoticons are displayed as a dynamic progression in which the plurality of emoticons are successively switched between based on the order of the second selection, wherein, during the dynamic progression, a first emoticon is replaced by a second emoticon based on an order of the first emoticon and the second emoticon in the order of the second selection; and wherein generating the timeline emoticon is suspended when a fixed-term emoticon included in the plurality of emoticons has expired.

2. The operating method of claim 1, wherein the timeline emoticon comprises at least one of:

type information indicating that the plurality of emoticons correspond to the timeline emoticon; and index information respectively indicating the plurality of emoticons included in the timeline emoticon.

3. The operating method of claim 1, wherein the generating of the timeline emoticon comprises generating the timeline emoticon based on whether a fixed-term emoticon with a time limit for use is included in the plurality of emoticons.

4. The operating method of claim 3, wherein the generating of the timeline emoticon based on whether a fixed-term emoticon is included comprises:

generating, when a fixed-term emoticon is not included, the timeline emoticon by editing the plurality of emoticons.

5. The operating method of claim 3, wherein the generating of the timeline emoticon based on whether a fixed-term emoticon is included comprises:

checking, when a fixed-term emoticon is included, whether the time limit for use of the fixed-term emoticon expires; and generating the timeline emoticon according to whether the time limit for use expires.

6. The operating method of claim 5, wherein the generating of the timeline emoticon according to whether the time limit for use expires comprises generating, when the time limit for use of the fixed-term emoticon does not expire, the timeline emoticon by including the fixed-term emoticon therein.

7. The operating method of claim 1, wherein the generating of the timeline emoticon comprises:

calculating a similarity between a sequence of the plurality of emoticons and a preset hidden sequence; and generating, when the similarity exceeds a preset reference value, the timeline emoticon by automatically inserting a hidden emoticon prepared corresponding to the hidden sequence to the plurality of emoticons.

8. The operating method of claim 1, wherein the generating of the timeline emoticon comprises displaying, when a sequence of the plurality of emoticons is edited to have a similarity exceeding a preset reference value to a preset hidden sequence, a hidden emoticon prepared corresponding to the hidden sequence.

9. The operating method of claim 1, wherein the generating of the timeline emoticon comprises at least one of:

editing the plurality of emoticons into an animated format according to an order of being selected by the user; and editing the plurality of emoticons into a slide format of individual emoticons according to the order of being selected by the user.

10. The operating method of claim 1, wherein the generating of the timeline emoticon comprises generating the timeline emoticon by editing the plurality of emoticons based on at least one of a content delivery network (CDN) address of a thumbnail image of the plurality of emoticons, information on the plurality of emoticons, and a type of the chat message.

11. The operating method of claim 1, further comprising:

deactivating, when a time limit for use of a fixed-term emoticon included in a pre-generated timeline emoticon expires, the expired fixed-term emoticon in the pre-generated timeline emoticon; and providing link information for purchasing the deactivated fixed-term emoticon.

12. The operating method of claim 1, wherein the plurality of emoticons comprise at least one of a static emoticon and a dynamic emoticon.

13. The operating method of claim 1, further comprising: storing the timeline emoticon.

14. The operating method of claim 1, further comprising:

displaying the interfacing object for switching to an input mode for generating the timeline emoticon in a predetermined area of the chat window.

15. An operating method of a terminal on which an application for an instant messaging service is installed, the operating method comprising:

verifying a type of a chat message received through the instant messaging service;

calling, when the chat message is of a type including a timeline emoticon in which a plurality of emoticons are successively switched between and displayed in time series, the plurality of emoticons based on indices of the plurality of emoticons in a sequence list included in the chat message; and successively switching between and displaying the plurality of emoticons in time series in a chat window for the instant messaging service according to the calling, wherein the timeline emoticon is generated by including the sequence list through a selection of a sender for the plurality of emoticons included in at least one emoticon set available to the sender, wherein by using the sequence list of the timeline emoticon by a terminal that received the chat message the plurality of emoticons are displayed as a dynamic progression in which the plurality of emoticons are successively switched between based on the order of the second selection, wherein, during the dynamic progression, a first emoticon is replaced by a second emoticon based on an order of the first emoticon and the second emoticon in the order of the second selection; and wherein generating the timeline emoticon is suspended when a fixed-term emoticon included in the plurality of emoticons has expired.

16. The operating method of claim 15, wherein the calling of the plurality of emoticons comprises:

calling a static emoticon based on an index corresponding to the static emoticon among the indices of the plurality of emoticons; and calling a plurality of individual emoticons constituting a dynamic emoticon based on an index corresponding to the dynamic emoticon among the indices of the plurality of emoticons.

17. The operating method of claim 15, wherein the displaying in the chat window comprises:

calling, when the sequence list matches a preset hidden sequence, a hidden emoticon prepared corresponding to the hidden sequence; and displaying the hidden emoticon and the plurality of emoticons together in a single speech balloon.

18. The operating method of claim 15, further comprising:

when an input of a user satisfying a preset condition for the timeline emoticon included in the chat message occurs, displaying information for inducing purchase of at least one of the plurality of emoticons included in the timeline emoticon in an area of the chat window where the chat message is displayed.

19. A non-transitory computer-readable storage medium storing instructions that, when executed by a processor, cause the processor to perform the operating method of claim 1.

* * * * *